United States Patent [19]

Ochiai

[11] 4,043,085
[45] Aug. 23, 1977

[54] LUMBER COVER

[75] Inventor: Fukuzo Ochiai, Okayama, Japan

[73] Assignee: Morishita Chemical Industry Co. Ltd., Japan

[21] Appl. No.: 701,988

[22] Filed: July 2, 1976

[30] Foreign Application Priority Data

Aug. 6, 1975 Japan .................................. 50-109724

[51] Int. Cl.² .......................... B62D 63/04; E04B 1/12
[52] U.S. Cl. ............................................. 52/3; 52/63; 428/257; 428/265; 428/137
[58] Field of Search .................... 52/3, 2, 4, 5, 63, 727; 428/45, 81, 99, 138, 192, 257, 137, 265; 135/5 R

[56] References Cited

U.S. PATENT DOCUMENTS

| 1,871,570 | 8/1932 | Weber | 52/3 |
| 1,871,571 | 8/1932 | Weber | 52/3 |
| 2,312,293 | 2/1943 | Weiss | 52/727 |
| 2,896,271 | 7/1959 | Kloote et al. | 52/63 |
| 3,406,490 | 10/1968 | Mudd | 52/3 |
| 3,715,843 | 2/1973 | Ballinger | 52/3 |
| 3,836,417 | 9/1974 | Yaeger | 52/63 |
| 3,862,876 | 1/1975 | Graves | 52/3 |
| 3,987,592 | 10/1976 | Herminghaus et al. | 52/3 |

Primary Examiner—Price C. Faw, Jr.
Assistant Examiner—Robert C. Farber
Attorney, Agent, or Firm—Dorfman, Herrell and Skillman

[57] ABSTRACT

Lumber cover comprising a cover structure consisting of a base sheet woven from rolled-flat yarns of a polyolefin resin and polyolefin film bonded to one or both sides of said base sheet, said cover structure being provided with bending marks, a number of holes, and nailing seats on the outer side of said sheet.

9 Claims, 5 Drawing Figures

LUMBER COVER

DETAILED DESCRIPTION OF THE INVENTION

This invention relates to lumber covers for covering stacks of lumber.

Lumber covered with a lumber cover having no air holes results in poor seasoning, while lumber closely wrapped within the cover rots due to the formation of dew at night. Thus, a cover must provide sufficient ventilation. Side portions of the cover must resist such natural external moisture conditions as rain and snow.

An object of the invention is to provide a lumber cover which is formed by laminating a strong base sheet with a film, providing the lamination with both bending marks along opposite longitudinal bending lines and a number of small holes along these lines, and applying as a nailing seat bonded tapes, obtained by cutting the laminated structure, to side portions of the lamination outside the rows of the small holes.

A fuller understanding of the above and other objects of the invention may be had by referring to the following description and claims, taken in conjunction with the accompanying drawings, in which:

Figure 1:
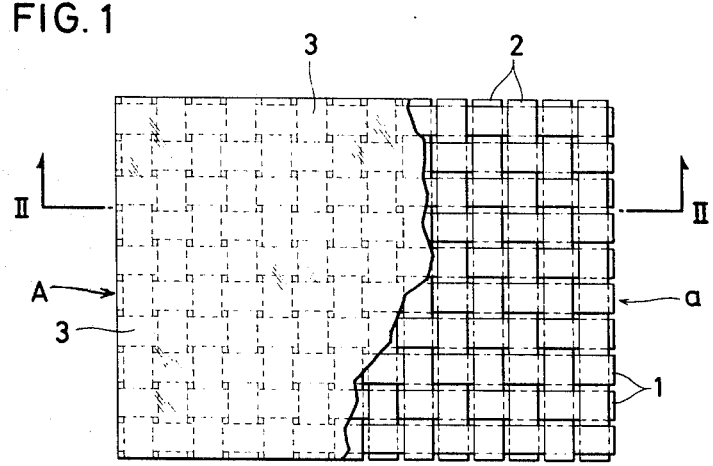
FIG. 1 is a plan view showing the lumber cover according to the invention, with the lamination film partly removed to expose the base sheet.
Figure 2:
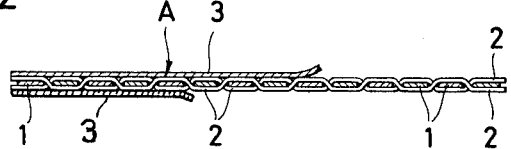
FIG. 2 is a sectional view taken along line II—II in FIG. 1.
Figure 3:
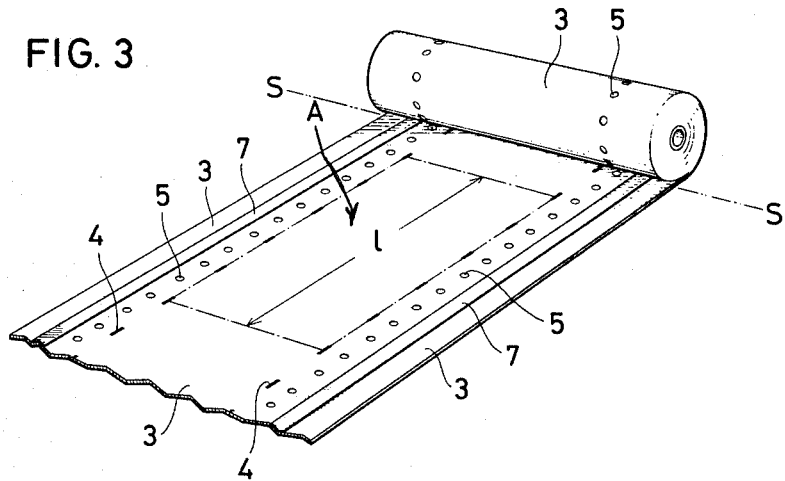
FIG. 3 is a perspective view showing a lumber cover according to the invention.

FIGS. 1 and 2 show the basic structure of the lumber cover according to the invention. Designated at $a$ is a base sheet (having a width of, for instance, 2.5 meters), which is woven from wrap and weft flat yarns 1 and 2 obtained by rolling a polyolefin resins, such as polyethylene and polypropylene, and which is laminated on one side or on opposite sides with a polyolefin film 3. This cover structure A is provided with bending indicia, in the illustrated embodiment marks 4, which are printed on the structure along longitudinal bending lines defining opposite side portions of the cover, as shown in FIG. 3. The cover is also formed with a number of air holes 5 of an adequate size arranged in rows extending parallel to and on the outer side of the bending lines by perforating the laminated structure A between the indicia 4 and the side edges of the laminated structure. Further, tapes 7 obtained by cutting the aforementioned cover structure A are bonded as nailing seats to portions of the structure on the outer sides of the rows of the air holes.

Figure 4:
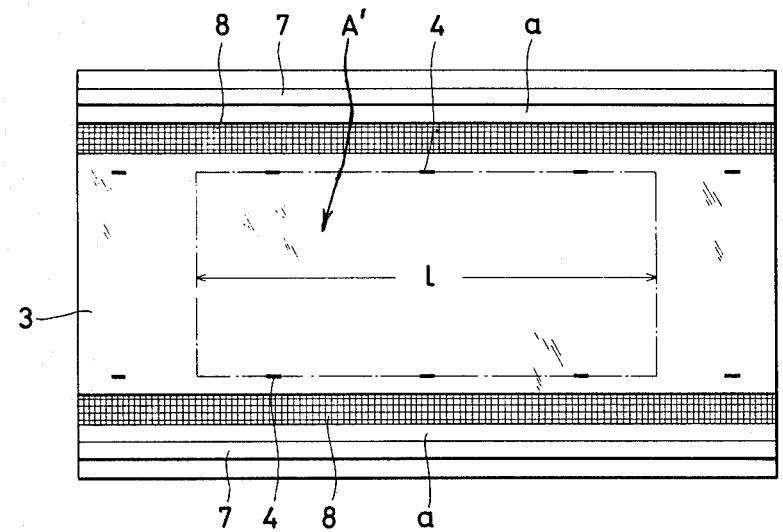
FIG. 4 is a plan view showing another embodiment of the lumber cover.

FIG. 4 shows a modification of the embodiment of FIG. 3. In this case, in lieu of forming the aforementioned air holes 5 by perforating the structure A, strip-like portions of the base sheet $a$ corresponding in position and width to the rows of air holes 5 are not laminated with the polyolefin film but are exposed, as indicated at 8, so as to utilize the exposed interstices or pores of the base sheet $a$ as ventilating holes. The remaining elements of the structure are substantially the same as the previous embodiment.

Figure 5:
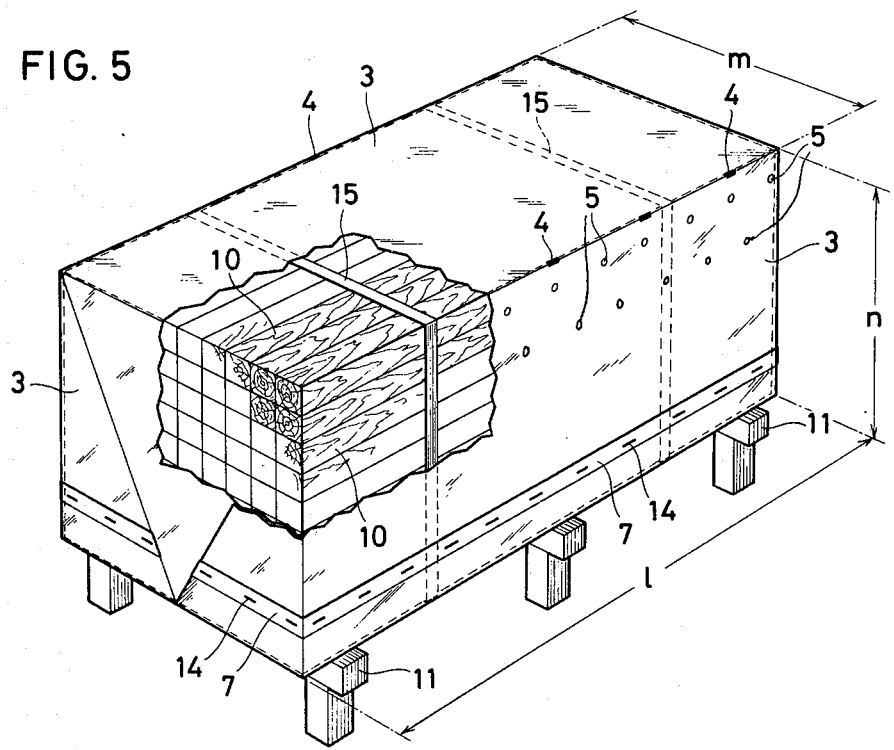
FIG. 5 is a perspective view showing a lumber stack covered with the lumber cover according to the invention.

To use the cover according to the invention, lumber 10 is stacked on base supports 11 provided on ground and is tied together by wire bands 15, providing a stack having a width $m$, a height $n$ and a length $l$, as shown in FIG. 5. Then the cover is cut, as indicated at S, to exceed the longitudinal dimension $l$ of the stack as in FIG. 3 and provide side flaps and end flaps. The cover is laid over the lumber stack as shown in FIG. 5. Then, its side flaps are downwardly bent along the bending marks 4, and are secured to the lumber by driving staples 14 into the nailing seats 7. Then, its end flaps which extend beyond the lumber stack are folded down and secured by staples 14 to the lumber. In this way, it is possible to neatly cover the lumber 10 and protect it from snow, while permitting ventilation of moist air through the ventilation openings 5.

As has been shown, the lumber cover according to the invention is very strong since its base sheet is woven from rolled flat yarns, is capable of preventing penetration of rain by virtue of the laminated waterproof film, and is further capable of preventing rotting of covered lumber by permitting evaporation of internal moisture through the ventilation holes.

Results of tests on the lumber cover according to the invention are as follows:

TEST 1

Lumber covers used for the test were of the type shown in FIG. 3, but without the bottom film, with their cover structure A consisting of a base sheet woven from 1,000-denier colorless polyethylene flat yarn warps and wefts at an interval of seven warps and wefts per inch and laminated on one side with 0.003 cm thick colorless polyethylene film. The air holes had a diameter of one cm and were arranged both in a single row and in two rows for each side at intervals 10, 20, 30, 40 and 50 cm in case of both single-row and two-row arrangements.

Lumber used for the test was square pine-tree timber 10 cm on one side and 360 cm in length $l$. These pieces of timber were stacked in 10 columns each of 10 timbers, as shown in FIG. 5. The lumber stack support had a height of 50 cm above the ground and a structure as shown in FIG. 5. The lumber stacks were exposed to weather, with a dew surface or supporting pad constituted of concrete, for a test period from September 1 until August 31 of the next year.

The dimensions of the lumber cover were 560 cm by 310 cm, the width of the nailing tape was 5 cm. The first air hole row was spaced 5 cm from the row of bending marks 4, and where a double row of holes were provided the second air hole row was spaced 10 cm from the first one. Table 1 shows the results of this text.

It will be seen from the results of the test that with lumber covers having fewer air holes more dew was formed, resulting in rotting of a large number of timbers at the top of the stack. In the case of lumber cover No. 2 having many air holes, however, rotting was extensive due to the intrusion of rainwater through the air holes to a somewhat greater extent, and such moisture was sufficiently dispersed. More rainwater intruded in the case of two-row air hole arrangement covers. The above facts show that it is necessary to select the number of air holes by taking into consideration the formation of moisture from lumber, the dew formation at night and the intrusion of rainwater. In this test, covers having 30-30 air holes in the cover length of 560 cm, and having

20-40 cm air-hole spacing in each row, that is, covers numbers 3, 5, 6 and 8 proved to be most suitable.

TABLE 1

| Lumber Cover No. | Number of Air Holes in Each Side Flap of Cover | Air-Hole Spacing | Number Of Stacked Timbers | Number Of Rotted Timbers | Number Of Sound Timbers |
|---|---|---|---|---|---|
| 1 | 92 in one row | 10 cm | 100 | 8 | 92 |
| 2 | 182 in two rows | 10 cm | 100 | 14 | 86 |
| 3 | 46 in one row | 20 cm | 100 | 4 | 96 |
| 4 | 92 in two rows | 20 cm | 100 | 10 | 90 |
| 5 | 30 in one row | 30 cm | 100 | 6 | 94 |
| 6 | 60 in two rows | 30 cm | 100 | 6 | 94 |
| 7 | 23 in one row | 40 cm | 100 | 12 | 88 |
| 8 | 46 in two rows | 40 cm | 100 | 6 | 94 |
| 9 | 18 in one row | 50 cm | 100 | 16 | 84 |
| 10 | 36 in two rows | 50 cm | 100 | 8 | 92 |
| 11 | 15 in one row | 60 cm | 100 | 18 | 82 |
| 12 | 30 in two rows | 60 cm | 100 | 12 | 88 |

TEST 2

Lumber covers used for this test were of the type of FIG. 4, with their cover structure consisting of a base sheet woven from the same 1,000-denier colorless polyethylene flat yarn warps and wefts at the same interval as in Test 1 and laminated with film in the manner as described in Test 1. The ventilation bands 8 were 10, 20 and 30 cm in width and spaced 5 cm away from the associated row of bending marks. The dimensions and methods of stacking of lumber used for the test were the same as in Test 1.

The dimensions of the lumber cover were 560 cm by 310 cm. Table 2 shows the results of the test. It will be seen that the ventilation band consisting solely of the flat yarn warps 1 and wefts 2 is inferior in dew dispersing capacity to the air hole system, resulting in rotting of a slightly greater number of timbers. Among the ventilation bands of various widths, a band having a width of 20 cm gave the best results.

TABLE 2

| Width of Ventilating Bands | Number Of Stacked Timbers | Number of Rotten Timbers | Number Of Sound Timbers |
|---|---|---|---|
| 10 cm | 100 | 16 | 84 |
| 20 cm | 100 | 7 | 93 |
| 30 cm | 100 | 8 | 92 |

I claim:

1. A lumber cover for a stack of lumber comprising a cover structure consisting of a base sheet woven from polyolefin resin flat yarns as warps and wefts and a polyolefin film bonded to at least one face of said base sheet, said cover structure when mounted on the stack having a width and length to cover the horizontal top and vertical sides of the stack, the vertical sides of said cover structure adapted to extend down from the top edges of the lumber stack and being provided with a number of air holes through the cover in at least one line disposed parallel to and below the top edge and means providing aligned nailing seats parallel to and below said air holes.

2. A cover according to claim 1 adapted to cover a stack having a rectangular top with predetermined width and length, said cover having indicia providing bending marks adapted to be placed along at least two opposite top edges of the top of the stack to define bending lines for said cover.

3. A cover according to claim 1 wherein said means providing nailing seats comprise strips of the polyolefin material, said strips being bonded to said cover structure along the length thereof.

4. A cover according to claim 1 wherein said yarns are rolled polyethylene or polypropylene yarns and said air holes extend along the entire length of each side of the cover.

5. A cover according to claim 1 wherein said air holes are approximately 1 cm in diameter and are spaced to provide between 30 and 60 holes in a length of 560 cm on each side, the holes in each row being spaced apart by 20 to 40 cm.

6. A cover according to claim 1 wherein said air holes are disposed in two rows on each side, spaced apart by a distance of approximately 10 cm.

7. A cover according to claim 8 wherein said bands each have a width in the range of 20 to 30 cm.

8. A lumber cover comprising a cover structure consisting of a base sheet woven from polyolefin resin flat yarns as warps and wefts and a polyolefin film bonded to at least one face of said base sheet, said cover structure having a width and length to cover the horizontal top and vertical sides of stack of lumber, said cover structure in portions thereof adapted to cover the sides having at least one row of perforations extending along the length of said cover on each side thereof to provide air holes, and means providing nailing seats on the outer side of said air holes, so as to be positioned below said air holes when covering the lumber stack, said perforations being formed by the interstices of the woven base sheet, said interstices being exposed by omitting a band of said film along the length of the structure along each side thereof.

9. A cover according to claim 1 wherein said film is bonded to both faces of said base sheet.

* * * * *

UNITED STATES PATENT OFFICE
CERTIFICATE OF CORRECTION

Patent No. 4,043,085  Dated August 23, 1977

Inventor(s) Fukuzo Ochiai

It is certified that error appears in the above-identified patent and that said Letters Patent are hereby corrected as shown below:

Column 1, line 42, "wrap" should be --warp--;
Column 1, line 43, "resins" should be --resin--;
Column 2, lines 61-62, "sufficiently" should be --insufficiently--
Column 2, line 68, "30-30" should be --30-60--;

Signed and Sealed this

Fifteenth Day of November 1977

[SEAL]

Attest:

RUTH C. MASON
Attesting Officer

LUTRELLE F. PARKER
Acting Commissioner of Patents and Trademarks